United States Patent
Wang et al.

(10) Patent No.: US 8,605,413 B2
(45) Date of Patent: Dec. 10, 2013

(54) ELECTRONIC DEVICE HOUSING AND MANUFACTURING METHOD THEREOF

(75) Inventors: Cong-Cong Wang, Shenzhen (CN); Zi-Ming Tang, Shenzhen (CN); Fa-Guang Shi, Shenzhen (CN); Jing-Hua Yuan, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 242 days.

(21) Appl. No.: 12/978,653

(22) Filed: Dec. 27, 2010

(65) Prior Publication Data

US 2012/0134078 A1 May 31, 2012

(30) Foreign Application Priority Data

Nov. 30, 2010 (CN) .......................... 2010 1 0565892

(51) Int. Cl.
*H05K 5/00* (2006.01)
*H05K 7/00* (2006.01)
*H04M 1/00* (2006.01)

(52) U.S. Cl.
USPC ............ 361/679.01; 361/679.02; 361/679.21; 361/679.26; 361/679.3; 455/575.1; 455/575.8

(58) Field of Classification Search
USPC ............ 361/679.01, 679.02, 679.08, 679.09, 361/679.3, 679.55–679.59; 455/325, 556.1, 455/550.1, 90.1, 575.1; 369/282, 291, 253, 369/44.16, 75.5
See application file for complete search history.

(56) References Cited

U.S. PATENT DOCUMENTS

| | | | |
|---|---|---|---|
| 2009/0101384 A1* | 4/2009 | Kawasaki et al. | 174/50.5 |
| 2010/0061040 A1* | 3/2010 | Dabov et al. | 361/679.01 |

* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

An electronic device housing includes a bottom housing, a support plate, a display panel, and a side frame. The support frame is welded in the bottom housing. The display panel is positioned on the support plate. The side frame is connected to a top edge of the bottom housing, such that the display panel is sandwiched between the support plate and the side frame. A manufacturing method for an electronic device housing is also provided.

9 Claims, 3 Drawing Sheets

ELECTRONIC DEVICE HOUSING AND MANUFACTURING METHOD THEREOF

BACKGROUND

1. Technical Field

The present disclosure relates generally to electronic device housings, more particularly, to an electronic device housing manufactured by welding.

2. Description of Related Art

A typical electronic device housing includes a bottom housing, a side frame, and a display panel. The display panel is positioned on the side frame. A periphery of the side frame is welded to the bottom housing. However, after welding, a welding portion between the side frame and the bottom housing may generate weld marks, deteriorating the device's appearance. The side frame can also be fixed to the bottom housing via a plurality of screws. However, in assembly of the electronic device housing, the plurality of screws should be operated in turns and a gap may be generated between the side frame and the bottom housing, also affecting appearance.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
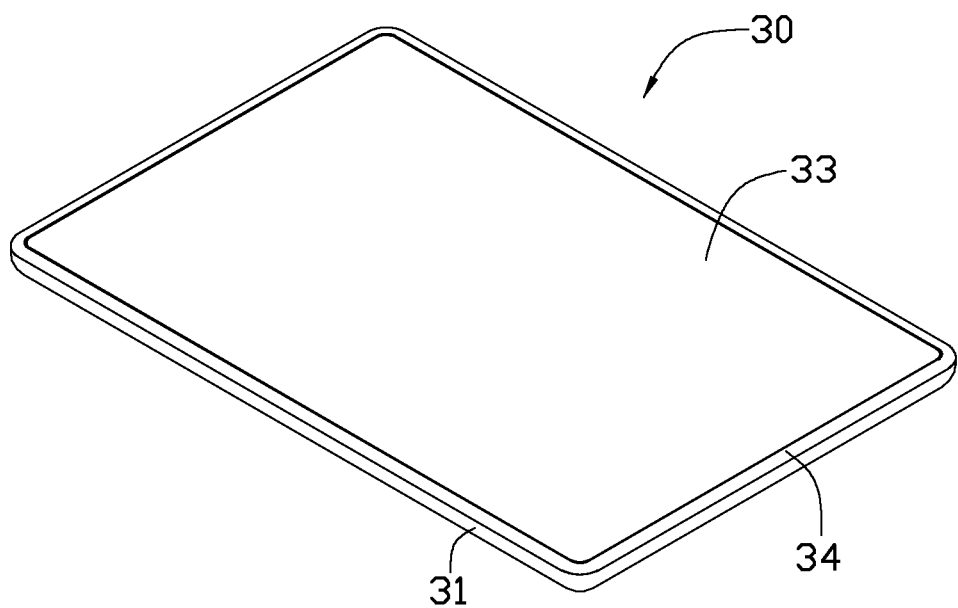
FIG. 1 is an isometric view of an embodiment of an electronic device housing.
Figure 2:
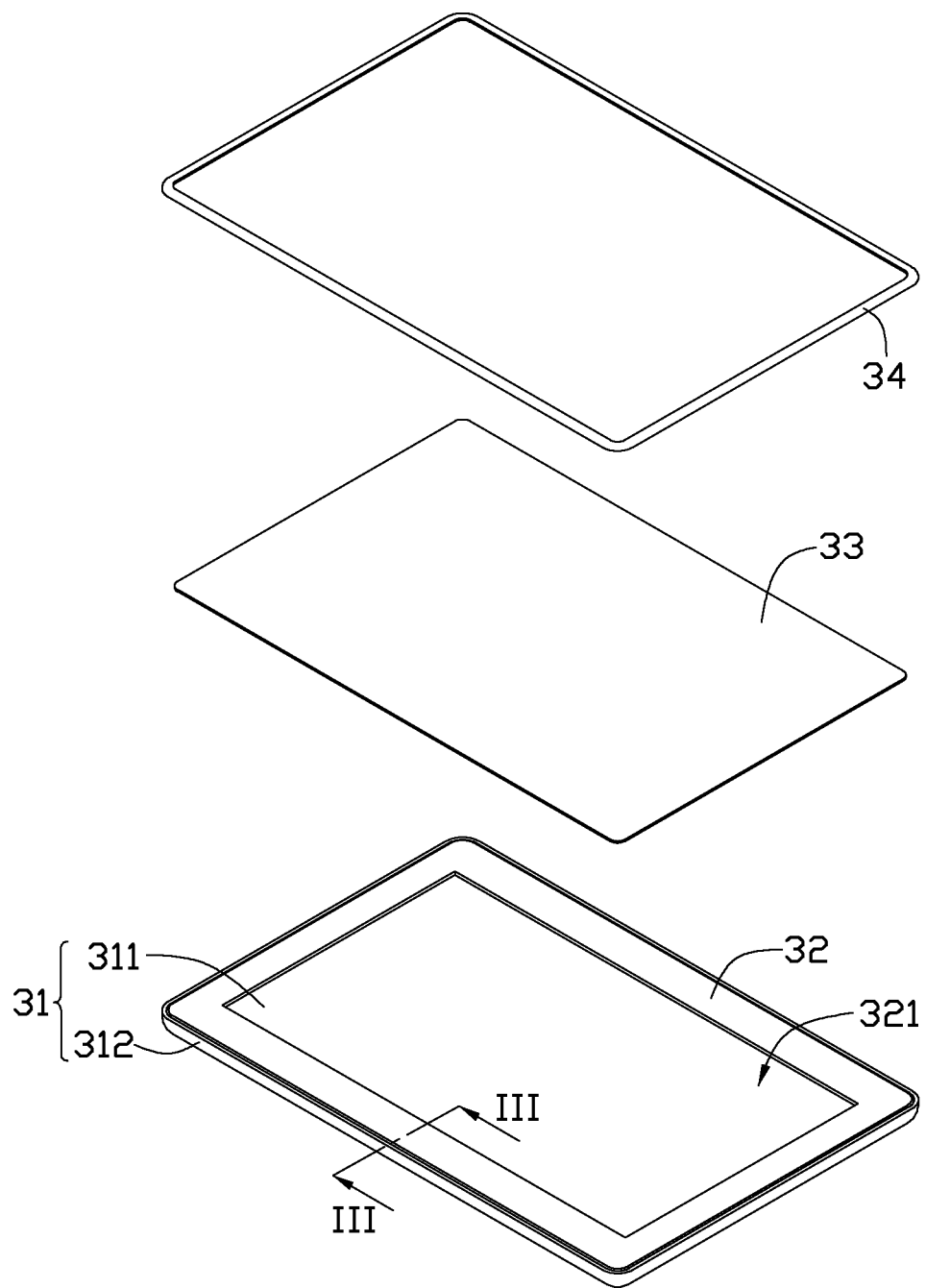
FIG. 2 an exploded, isometric view of the electronic device housing of FIG. 1 including a bottom housing, a support plate, a display panel, and a side frame.
Figure 3:
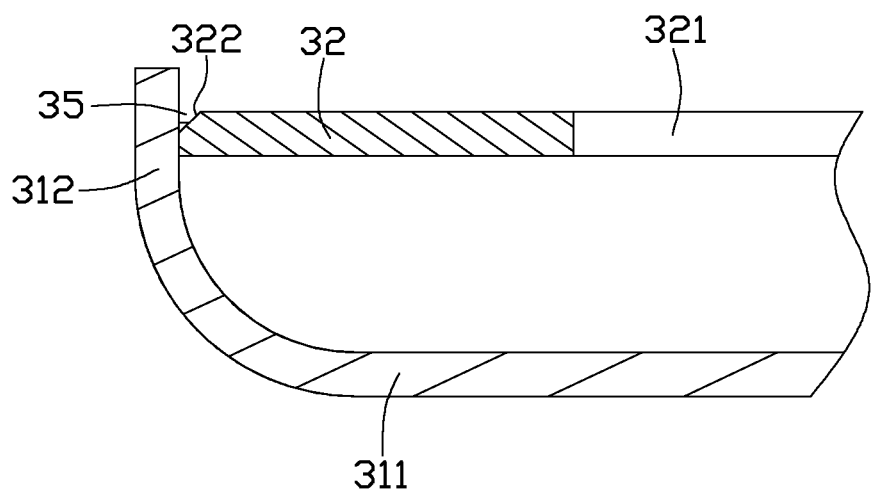
FIG. 3 is a partial cross-section of the bottom housing and the support frame of FIG. 2, taken along line III-III.

Referring to FIGS. 1 through 3, an embodiment of an electronic device housing 30 includes a bottom housing 31, a support plate 32, a display panel 33, and a side frame 34. The support plate 32 is welded in the bottom housing 31. The display panel 33 is positioned on the support plate 32. The side frame 34 is connected to a top edge of the bottom housing 31.

The bottom housing 31 includes a base plate 311 and a curved sidewall 312 extending from an edge of the base plate 311. In the illustrated embodiment, the bottom housing 31 is made of metal materials, such as aluminum.

The support plate 32 defines a through hole 321 in a center portion. The support plate 32 further forms an angled portion 322 (see FIG. 3) on an edge of the support plate 32 adjacent the sidewall 312. In the illustrated embodiment, the support plate 32 is substantially rectangular, and the through hole 321 is substantially rectangular. The support plate 32 is made of metal materials, such as aluminum. An outer periphery of the support plate 32 is welded to an inner periphery of the curved sidewall 312 of the bottom housing 31.

The display panel 33 can be a touch panel. The side frame 34 is substantially rectangular in this embodiment, and made of plastic materials.

One embodiment of a manufacturing method for the electronic device housing 30 is as follows. First, the bottom housing 31, the support plate 32, the display panel 33, and the side frame 34 are provided. The support plate 32 is positioned in the bottom housing 31, thereby forming a receiving groove 35 (see FIG. 3) between the sidewall 312 of the bottom housing 31 and the angled portion 322 of the support plate 32. A connecting portion of the bottom housing 31 and the support plate 32 is welded by a laser (not shown) along a transverse axis of the support plate 32, in which some welding slag will fill in the receiving groove 35. The connecting portion of the bottom housing 31 and the support plate 32 is then milled by a cutter (not shown). The display panel 33 is positioned on the support plate 32, and the side frame 34 is adhered to the top edge of the bottom housing 31, such that the display panel 33 is sandwiched between the support plate 32 and the side frame 34.

Because the support plate 32 is welded in the bottom housing 31, the electronic device housing 30 exhibits favorable appearance. The display panel 33 is positioned between the support plate 32 and the side frame 34, and the side frame 34 can form a decorative pattern.

It should be appreciated that the support plate 32 may be replaced by a plurality of support pieces welded to the bottom housing 31 at the same height. In addition, cushion blocks may be positioned between the support plate 32 and display panel 33, thereby preventing the display panel 33 from damage by external force.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device with a housing, comprising:
    a bottom housing comprising a base plate and a curved sidewall extending from an edge of the base plate;
    a substantially rectangular support plate welded in the bottom housing, wherein the support plate defines a through hole to form a closed frame and allows the electronic device to display therethrough, and a closed outer periphery of the support plate is entirely welded to a closed inner periphery of the curved sidewall of the bottom housing; and
    a display panel positioned on the support plate; and
    a side frame connected to a top edge of the bottom housing, such that the display panel is sandwiched between the support plate and the side frame; and
    wherein the support plate forms an angled portion on an edge of the closed outer periphery of the support plate adjacent to the curved sidewall of the bottom housing, an amount of welding slag is partially filling in a receiving groove formed between the closed outer periphery of the support plate and a closed inner periphery of the curved sidewall, and the amount of welding slag is directly contacting a portion of the angled portion and preventing a gap generated between the side frame and the bottom housing.

2. The electronic device housing of claim 1, wherein the support plate is welded to the bottom housing by laser.

3. The electronic device housing of claim 1, wherein the side frame is adhered to a top edge of the bottom housing.

4. The electronic device housing of claim 1, wherein the bottom housing and the support plate are made of metal material.

5. The electronic device housing of claim 1, wherein the side frame is made of Plastic material.

6. A method of manufacturing an electronic device with a housing, comprising:
    providing a bottom housing and a substantially rectangular support plate, the bottom housing comprising a base plate and a curved sidewall extending from an edge of the base plate, and the support plate defining a through hole to form a closed frame and allows the electronic device to display therethrough, and having an angled portion at an edge;

positioning the support plate in the bottom housing, thereby forming a receiving groove between the bottom housing and the angled portion of the support plate;

welding a connecting portion of the bottom housing and the support plate by laser along a transverse axis of the support plate around a closed, inner periphery of the curved sidewall of the bottom housing, wherein an amount of welding slag is partially filled in the receiving groove formed between a closed, outer periphery of the support plate and the closed, inner periphery of the curved sidewall, and the amount of welding slag are directly contacting a portion of the angled portion;

after welding, milling the connecting portion of the bottom housing and the support plate: and providing a display panel positioned on the support plate; and providing a side frame connected to a top edge of the bottom housing, such that the display panel is sandwiched between the support plate and the side frame.

7. The method of claim 6, further providing a side frame and a display panel, positioning the display panel on the support plate, and adhering the side frame to the top edge of the bottom housing, such that the display panel is sandwiched between the support plate and the side frame.

8. The method of claim 6, wherein the bottom housing and the support plate are made of metal material.

9. The method of claim 6, wherein the side frame is made of plastic material.

* * * * *